(12) United States Patent
Allport et al.

(10) Patent No.: US 7,798,774 B2
(45) Date of Patent: Sep. 21, 2010

(54) TURBINE HOUSING FOR A TURBOCHARGER

(75) Inventors: John Martin Allport, Halifax (GB); Georgina Chiu, Hong Kong (HK); Clive Robert Martin, Halifax (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 59 days.

(21) Appl. No.: 12/321,190

(22) Filed: Jan. 16, 2009

(65) Prior Publication Data

US 2009/0129920 A1    May 21, 2009

Related U.S. Application Data

(63) Continuation of application No. PCT/GB2007/002725, filed on Jul. 18, 2007.

(30) Foreign Application Priority Data

Jul. 20, 2006    (GB) .................... 0614392.9

(51) Int. Cl.
*F04D 29/42* (2006.01)
(52) U.S. Cl. ...................... 415/205; 415/915
(58) Field of Classification Search ............ 415/204, 415/205, 206, 120, 915, 203, 224
See application file for complete search history.

(56) References Cited

U.S. PATENT DOCUMENTS

| 1,483,995 | A | 2/1924 | Birchard |
| 6,553,762 | B2 * | 4/2003 | Loffler et al. ............. 415/204 |
| 7,562,528 | B2 * | 7/2009 | Wood ..................... 415/204 |
| 2003/0053910 | A1 | 3/2003 | Hosny |

FOREIGN PATENT DOCUMENTS

| DE | 20 40 901 | 3/1972 |
| DE | 10218354 | 11/2003 |
| EP | 1462628 | 9/2004 |
| GB | 935 231 | 8/1963 |
| GB | 0614392.9 | 9/2006 |
| JP | 6317170 | 11/1994 |
| JP | 61 205334 | 9/1998 |
| JP | 2006161574 | 6/2006 |
| WO | PCT/GB2007/002725 | 10/2007 |
| WO | WO 2008/009936 | 1/2008 |

* cited by examiner

*Primary Examiner*—Richard Edgar
(74) *Attorney, Agent, or Firm*—Krieg DeVault LLP; J. Bruce Schelkopf, Esq.

(57) ABSTRACT

A turbine housing (13) for a radial flow turbine, particularly a turbine used in an exhaust gas turbocharger. The housing has a general volute shape with a substantially annular part extending around the turbine axis and an inlet duct (20) extending therefrom. The inlet duct (20) has a first wall facing part of the outer surface of the annular part of the housing, a pair of spaced webs (44) extending from the outer surface of the circular part of the housing to the first wall, the webs defining a valley (45) therebetween. The arrangement renders the housing stiffer and less prone to fatigue cracking.

24 Claims, 4 Drawing Sheets

TURBINE HOUSING FOR A TURBOCHARGER

CROSS REFERENCE TO RELATED APPLICATIONS

The present application is a continuation application of PCT/GB2007/002725 filed Jul. 18, 2007 which claims priority to United Kingdom Patent Application No. 0614392.9, filed Jul. 20, 2006, each of which is incorporated herein by reference.

The present invention relates to a housing for a radial flow turbine and more particularly, but not exclusively, to such a turbine incorporated in an exhaust gas turbocharger.

The turbocharger is a well-known device for supplying air to the intake of an internal combustion engine at pressures above atmospheric (boost pressures) and is widely used on automobiles and the like. A conventional turbocharger is shown in FIG. 1 and comprises an exhaust gas driven radial flow turbine wheel 10 rotatably mounted on one end of a turbocharger shaft 11 and a compressor impeller wheel 12 mounted on the other end of the shaft. Both the wheels 10, 12 are received in respective housings: the turbine housing 13 having an exhaust gas inlet 14 and outlet 15 and the compressor housing 16 having an air inlet 17 and a compressed air outlet volute 18. The passage of exhaust gas through the turbine housing serves to drive the turbine wheel 10 in rotation which, in turn, effects rotation of the compressor impeller 12 within its housing such that it delivers compressed air to the intake manifold (not shown) of the internal combustion engine, thereby increasing engine power.

The turbine wheel of a radial flow turbine is mounted within the turbine housing 13 (shown from the exterior in FIG. 2) such that there is an annular passageway 19 (FIG. 1) defined by a clearance between the periphery of the turbine wheel 10 and the inside of the housing and a generally cylindrical axial outlet 15 extending from the turbine wheel. The annular passageway 19 is connected to an inlet duct 20 formed in the housing and which extends in a direction that is approximately tangential to the annular passageway. The inlet duct 20 has an outwardly extending flange 21 at its open end for connection to the exhaust manifold. Exhaust gas admitted to the inlet duct 20 flows to the outlet 15 via the turbine wheel 10 and the annular passageway 19 thereby driving the turbine wheel 10. The arrangement of the inlet duct 20, annular passageway 19 and outlet 15 gives the exterior of the turbine housing a volute or spiral appearance.

During turbocharger operation, the turbine housing is subject to repeated heating and cooling cycles. When the engine is started from cold the turbine housing is generally at ambient temperature but this increases significantly during normal operation, particularly when under high load, thereby causing the housing to expand. After the engine is switched off the housing begins to cool down and contract. The repeated expansion and contraction of the housing renders it prone to thermal fatigue cracking, particularly in areas where the expansion and contraction rates may be different. One particular area of concern is the fillet 22 (FIG. 2) where the inlet duct 20 joints the rest of the volute, commonly known as the "chin" of the housing. High thermal stresses are developed at this intersection as, in effect, the inlet duct 20 tends to "unwind" from the volute.

The simplest and most evident way of improving fatigue life is to increase the size of the radius of the chin, thus making the transition between the volute and the inlet as gradual as possible, however this is not always possible owing to space constraints.

Turbine housings of this kind are generally formed by a casting operation using a casting mould with a rectangular opening. The casting process results in a casting feed boss 23 being formed by the opening on the outer surface of the housing, adjacent to the chin 22. Attempts have been made to fill the chin area with material by for example, providing a supporting web that fills the area between the boss 23 and the exterior of the inlet duct 20 in the chin area 22. This has tended to reduce fatigue cracking by stiffening the housing in the chin area and also has the advantage that it provides a casting "bridge" that acts as a direct feed path for the large volume of molten material required in the casting process to form the flange 21 on the inlet duct. However, it has been found that the sheer volume of material required leads to additional stresses being induced and in some instances this caused distortion and stressing of the flange.

It is an object of the present invention to provide an improved housing for a turbine of a turbocharger.

According to a first aspect of the present invention there is provided a turbine housing for a radial flow turbine having an axis of rotation, the housing comprising a generally volute shape with a substantially annular or annular part extending around the axis and an inlet duct extending therefrom, the inlet duct having a first wall facing part of the annular part of the housing, at least two spaced apart webs, each web extending from the outer surface of the substantially annular or annular part of the housing to the first wall, the webs defining a valley therebetween.

The connection of the inlet duct to the rest of the volute by the spaced webs renders the housing sufficiently stiff to avoid fatigue cracking without imparting additional thermal stresses.

It is to be appreciated that there may be more than just two webs.

The webs may be integrally formed with the housing and may increase in thickness from the annular part to the inlet duct. The webs may initially decrease in thickness along their length and then increase in thickness before joining the inlet duct. They may be divergent in the same direction. The webs may increase in thickness towards a bottom of the valley.

The valley is defined by arcuate declivities of the facing surfaces of the webs.

The first wall of the inlet duct may be arcuate.

There may be an arcuate declivity on said first wall extending a mouth of the opening to the valley bottom.

The mouth of the inlet may have an outwardly extending flange. The webs may join to said flange.

The flange is generally rectangular in outline and the webs join with the flange substantially adjacent to (including at) the corners thereof.

The inlet duct has a second wall opposite said first wall, the walls having central depressions. The flange may have corresponding depressions.

The webs may be free of discontinuities.

The webs may extend from a casting boss defined on the adjacent portion of the outer surface of the annular part of the housing.

The housing may have an outlet extending axially from the housing.

According to a second aspect of the present invention there is provided a radial flow turbine for use in a turbocharger, the turbine comprising a turbine wheel rotationally mounted in a housing as defined above for rotation about the rotational axis.

According to a third aspect of the present invention there is provided a turbocharger comprising a compressor connected to a radial flow turbine having a housing as defined above.

According to a fourth aspect of the present invention there is provided a method for manufacturing a turbine housing comprising the steps of providing a casting die defining an aperture into which molten material is poured, the die being shaped to form a turbine housing having a generally volute shape with a substantially annular or annular portion and an inlet duct extending approximately tangentially therefrom, the die having a first surface for defining a first wall of the inlet duct and a second surface for defining an adjacent arcuate surface of the annular portion of the housing that faces the first wall of the inlet duct, including configuring the die so as to have at least two spaced apart channels extending between the first and second surfaces that provide spaced apart flow paths, introducing molten material into the die through the die aperture and allowing a portion of the material to flow along the channels, allowing the material to solidify and then ejecting the solidified material from the die.

Specific embodiments of the present invention will now be described, by way of example only, with reference to the accompanying drawings in which.

Figure 1:
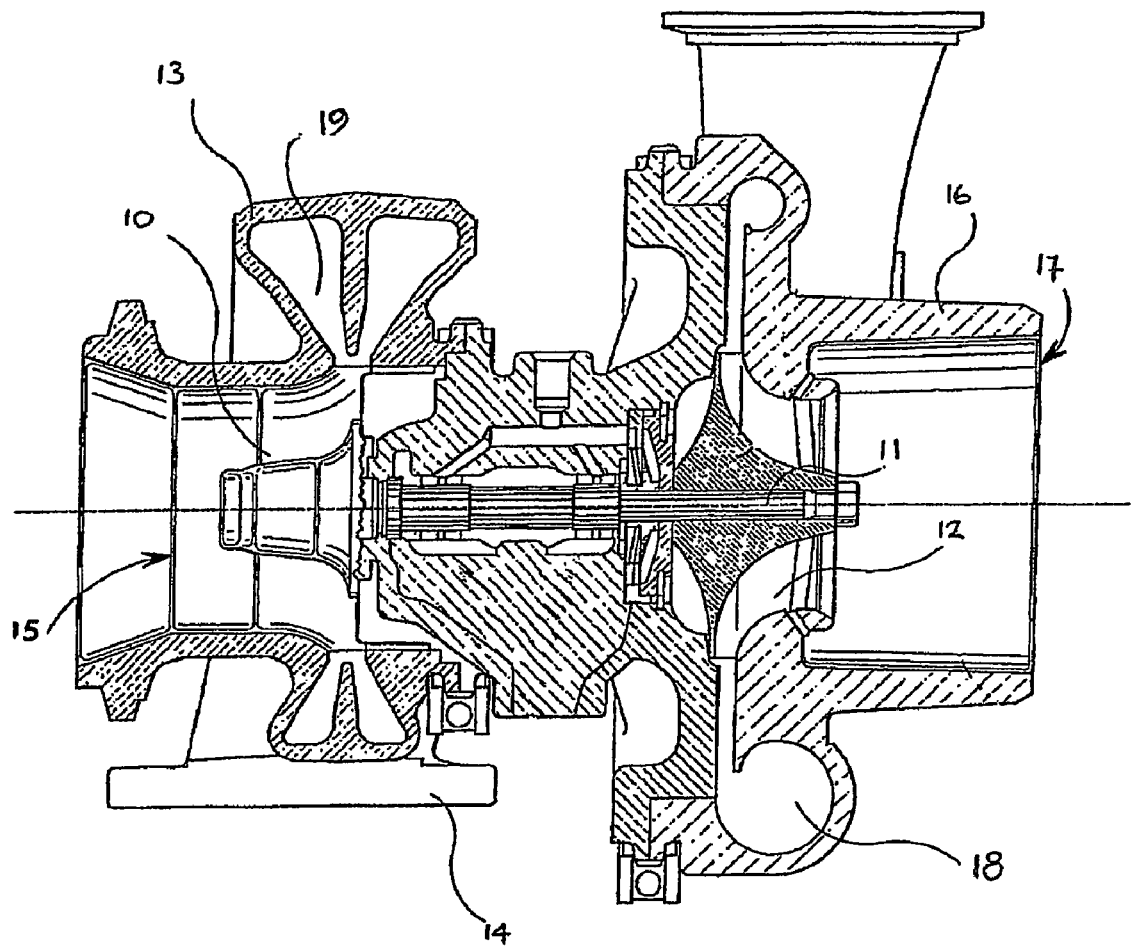
FIG. 1 is a radially sectioned view of a turbocharger in which the present invention may be employed.
Figure 2:
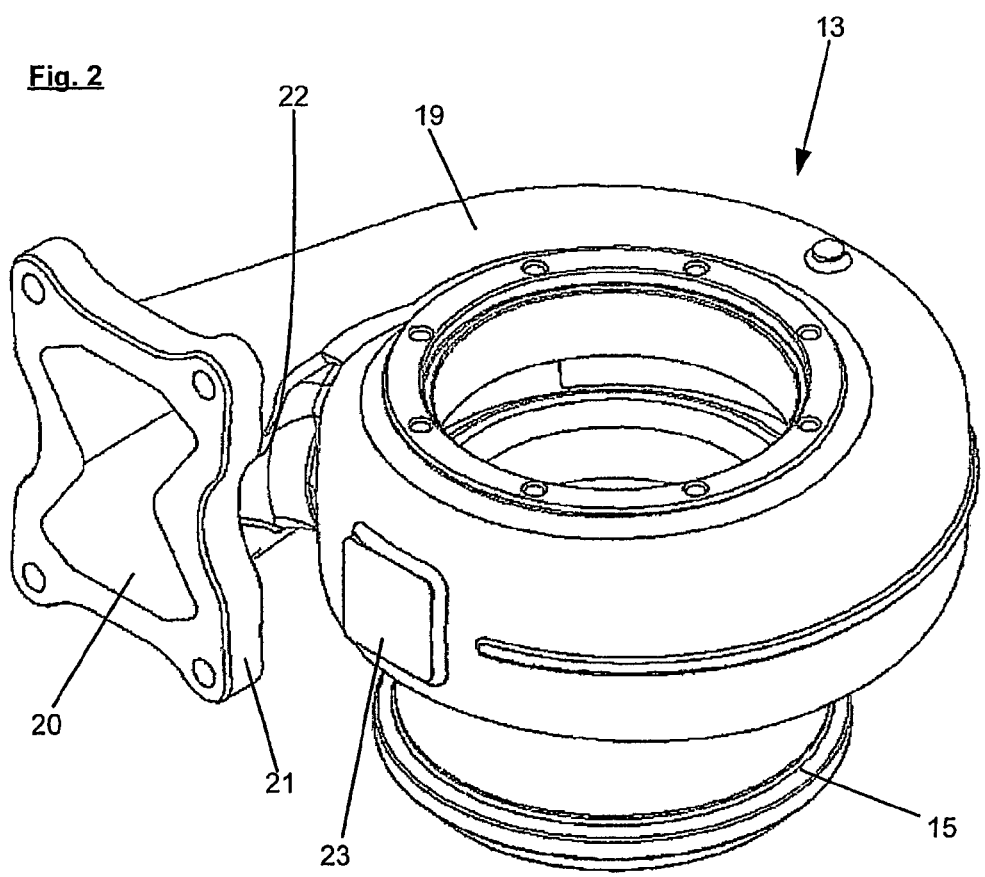
FIG. 2 is a perspective view of a conventional turbine housing for use in the turbocharger of FIG. 1.
Figure 3:
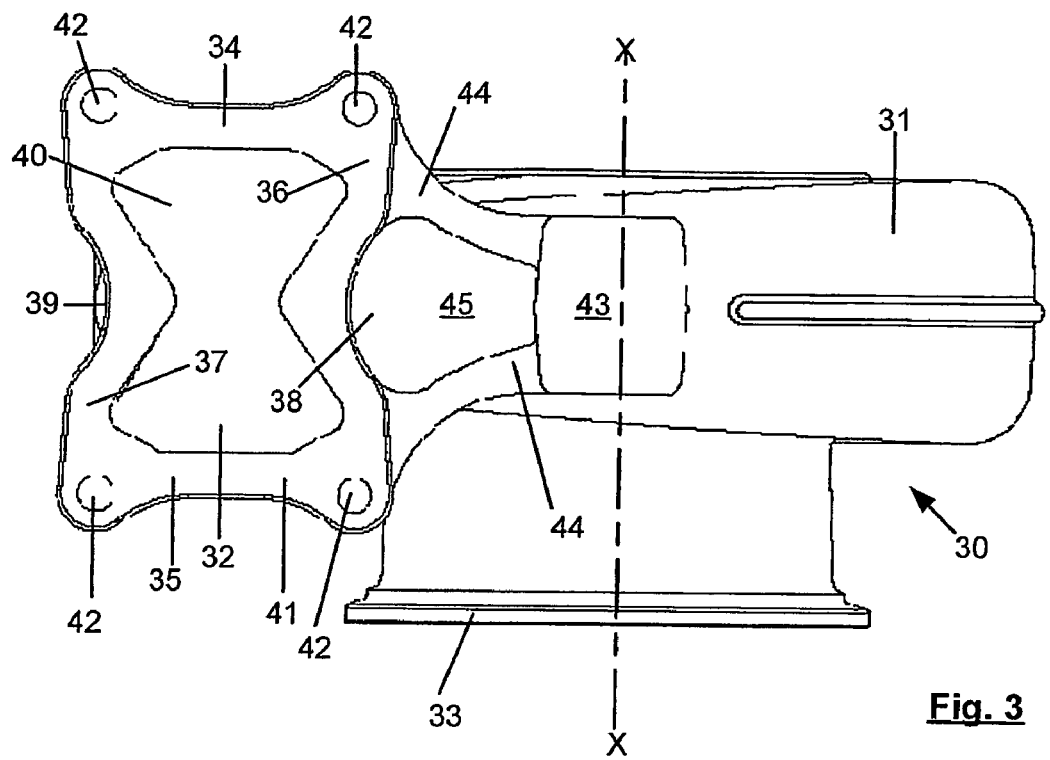
FIG. 3 is an end view of a first embodiment of a turbine housing according to the present invention, looking towards the inlet duct, the housing being suitable for use in a turbocharger such as the one shown in FIG. 1.
Figure 4:
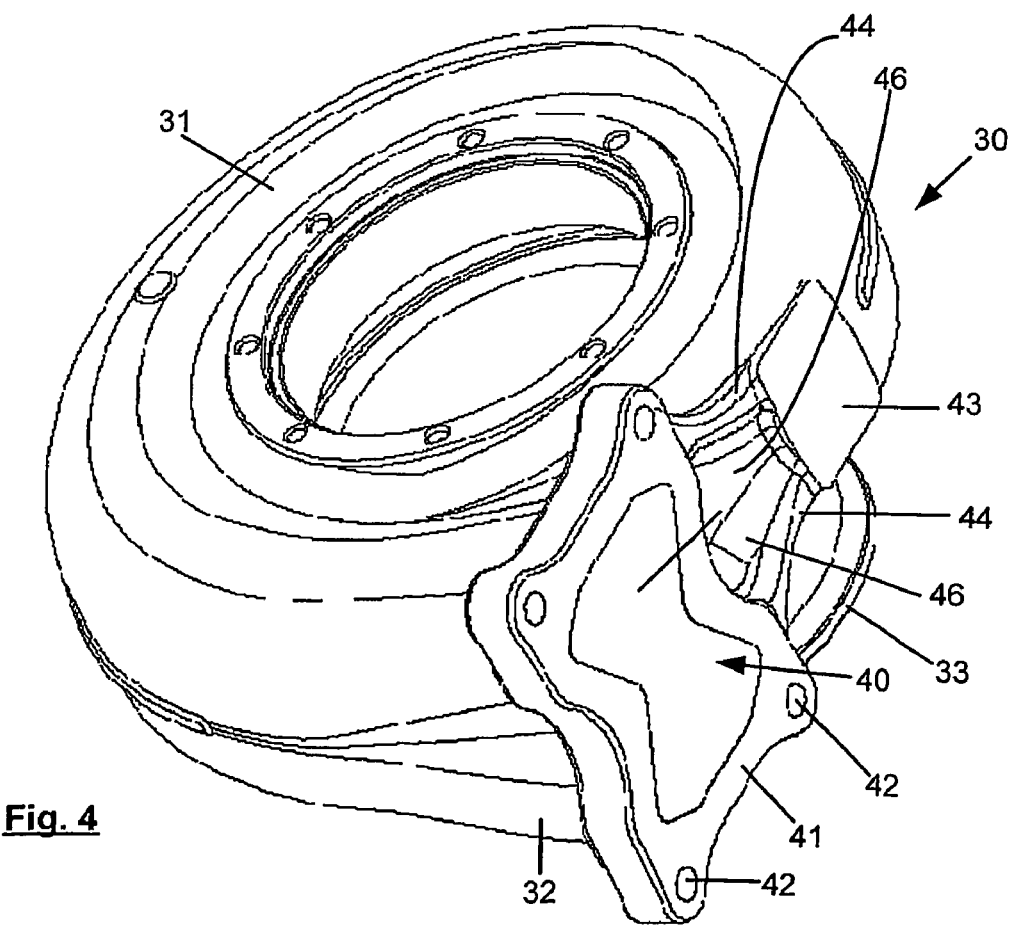
FIG. 4 is a perspective view from one side of the turbine housing of FIG. 3.
Figure 6:
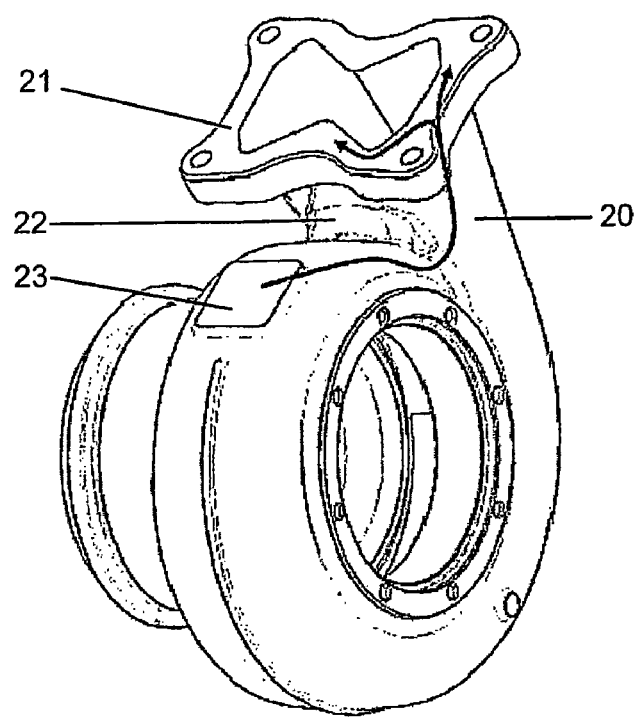
Figure 7:
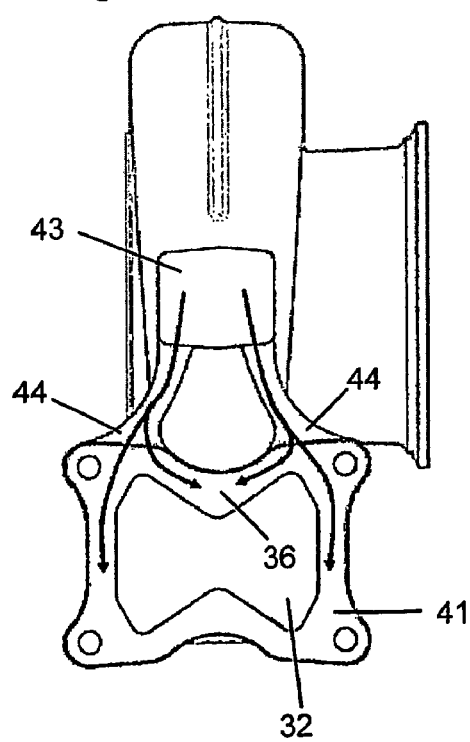
Figure 8:
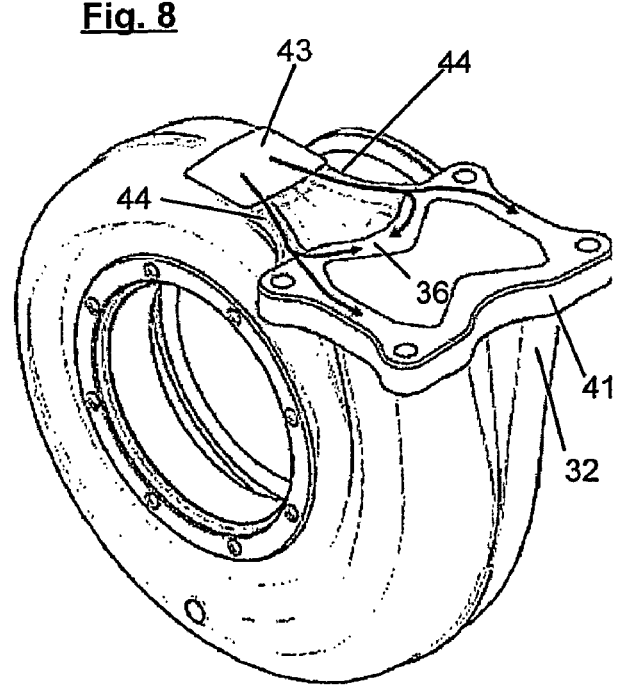

FIG. 6 corresponds to the conventional turbine housing of FIG. 2 but is annotated to indicate the flow of material between an inlet duct and the rest of the volute during the casting process; and FIGS. 7 and 8 correspond to FIGS. 3 and 4 but are annotated to indicate the flow path of material between the inlet duct and the rest of the volute during the die casting process according to the present invention.

Referring now to FIGS. 3 and 4 of the drawings, the first exemplary turbine housing 30 for a turbocharger turbine is casting having a generally volute shape that defines a central rotational axis X for a turbine wheel (not shown), an annular passage 31 around said axis and an inlet duct 32 that extends generally tangentially from the annular passage. The annular passage is designed to surround a turbine wheel with a small clearance. A cylindrical outlet duct 33 extends from axially from one side of the housing and is substantially coaxial with the rotational axis.

The inlet duct 32 is defined by opposed side walls 34, 35 joined by opposed front and rear walls 36, 37. The side walls 34, 35 are substantially straight and parallel whereas the front and rear walls 36, 37 have central depressions 38, 39 that project inwardly into the passage 40 defined by the duct 32. The open end of the inlet duct 32 has an outwardly extending flange 41 that follows the shape of the inlet duct such that the opening is reduced in depth at its centre. The four corners of the flange have fixing apertures 42 for connection to the exhaust manifold (not shown) of the engine to which the turbocharger is connected.

On the curved outer surface of the volute there is an approximately rectangular casting boss 43 adjacent to, but spaced from, the inlet duct 32. A pair of spaced webs 44, integrally formed with the housing 30, extend divergently from the proximate corners of the casting boss 43 across to the flange 41 where they join the rear wall 37 adjacent to the flange corners. The thickness of each web 44 increases gradually in the direction towards the flange 41 and they both extend downwardly into the "chin" area defined between the inlet duct and the rest of the volute, again increasing gradually in thickness so that they define a valley 45 with arcuate declivities 46. The surface of the rear wall 37 of the duct 32 and flange 41 is also arcuate to give the valley 45 an overall appearance of a concave part of a scoop. The surfaces of each web 44, the rear wall 37 of the inlet duct 32 and flange 41 and the valley 45 are preferably smooth and free from discontinuities.

The smooth transitions from thin to thick sections in the webs 44 significantly reduce the risk of fatigue cracking.

The webs 44 and the intermediate valley 45 serve to provide additional rigidity and stiffness to the housing that is able to withstand high static and dynamic loads imposed by heavy attachments such as exhaust brakes or electric actuators for variable geometry turbines. The stiffening of the housing keeps the resonant conditions above the engine running speed and generally serves to avoid not only fatigue cracking but also stresses set up by virtue of thermal inertia in material between the inlet duct and the rest of the volute.

Figure 5:
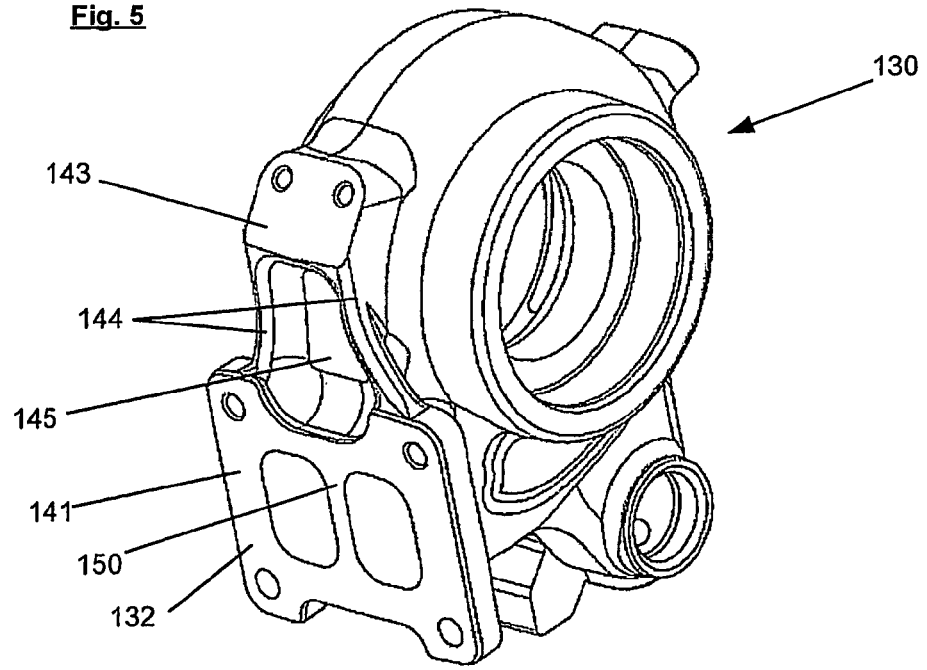
FIG. 5 is a perspective view from one side of a second embodiment of a turbine housing in accordance with the present invention.

A second embodiment of the housing is depicted in FIG. 5. Components common to the embodiment of FIGS. 3 and 4 are given the same reference numerals but increased by 100 and are not further described except in so far as they differ from those of FIGS. 3 and 4. This turbine housing 130 has a twin entry inlet 132 with a wall 150 diving the mouth of the inlet into two parts. The inlet duct 132 is connected to the rest of the volute by the same arrangement of webs 144 that extend between the flange 141 and the casting boss 143, a concave valley 145 again being defined between the webs 144.

FIGS. 6, 7 and 8 illustrate the improvement in the flow of material in the die casting process. In FIG. 6, which depicts a conventional turbine housing, the molten material flows from the casting boss 23 around the annular part of the volute and down into the chin area 22 before passing along the inlet duct 20 to the flange 21, as represented by the arrows. It will be appreciated that in order to form the relatively thick flange a significant volute of material is required and this has to pass along thin-walled passages of the die that form the volute. In contrast, and with reference to FIGS. 7 and 8, the die for producing a turbine housing according to the present invention provides for two spaced divergent channels that allow material to flow from the casting boss 43 on the outside surface of the annular portion of the volute directly to the flange 41 and the front wall 36 of the inlet duct 32, as represented by the arrows. Molten material is introduced into the die aperture and some of the material flows from the aperture along the channels to the inlet duct thus forming the two webs 44 depicted in the figures.

It will be appreciated that numerous modifications to the above described design may be made without departing from the scope of the invention as defined in the appended claims. For example, in the absence of a casting boss at a convenient location the webs may just extend from the curved surface of the housing and they may join with the flange at or near the corners thereof. Moreover, it is to be appreciated that the invention may have application to radial flow turbines that are used in other applications besides turbochargers. Furthermore, embodiments are contemplated in which there are three or more webs configured so that there is a valley between adjacent webs.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A turbine housing for a radial flow turbine having an axis of rotation, the housing comprising a casting have a generally volute shape with a substantially annular part extending around the axis and an inlet duct extending therefrom, the inlet duct having a first wall facing part of an outer surface of the annular part of the housing, at least two spaced apart webs, each web extending from a portion of the outer surface of the substantially annular part of the housing to the first wall, the webs defining a valley therebetween.

2. A turbine housing according to claim 1, wherein the webs are integrally formed with the rest of the housing.

3. A turbine housing according to claim 1, wherein the webs increase in thickness from the substantially annular part of the housing to the first wall of the inlet duct.

4. A turbine housing according to claim 1, wherein the webs are divergent in the direction from the substantially annular part of the housing to the first wall of the inlet duct.

5. A turbine housing according to claim 1, wherein the webs increase in thickness towards a bottom of the valley.

6. A turbine housing according to claim 1, wherein each web includes at least one facing surface, and wherein the valley is defined by arcuate declivities of facing surfaces of the webs.

7. A turbine housing according to claim 1, wherein the first wall of the inlet duct is arcuate.

8. A turbine housing according to claim 1, wherein there is an arcuate declivity on said first wall extending from a mouth of the inlet to the valley bottom.

9. A turbine housing according to claim 1, wherein the inlet has a mouth with an outwardly extending flange.

10. A turbine housing according to claim 9, wherein the webs are joined to said flange.

11. A turbine housing according to claim 10, wherein the flange is generally rectangular in outline and the each web joins with the flange substantially adjacent to a corner of the flange.

12. A turbine housing according to claim 1, wherein the inlet duct has a second wall opposite said first wall, both the walls having central depressions.

13. A turbine housing according to claim 1, wherein the webs are free of discontinuities.

14. A turbine housing according to claim 1, wherein a casting boss is defined on the outer surface of the annular part of the housing.

15. A turbine housing according to claim 14, wherein the webs extend from the casting boss.

16. A turbine housing according to claim 1 and further comprising an outlet extending axially from the housing.

17. A turbine housing according to claim 1, wherein each web extends from an adjacent portion of the outer surface of the substantially annular part of the housing.

18. A turbine housing according to claim 1, where there are more than two webs and a plurality of valleys defined between the webs.

19. A turbine comprising a turbine wheel disposed in a turbine housing according to claim 1.

20. A turbocharger comprising a compressor connected to a turbine having a turbine housing according to claim 1.

21. A method for casting a turbine housing comprising the steps of providing a casting die defining an aperture into which molten material is poured, the die being shaped to form a turbine housing having a generally volute shape with a substantially annular portion and an inlet duct extending approximately tangentially therefrom, the die having a first surface for defining a first wall of the inlet duct and a second surface for defining an adjacent arcuate surface of the substantially annular portion of the housing that faces the first wall of the inlet duct, including configuring the die so as to have at least two spaced apart channels extending between the first and second surfaces that provide spaced apart flow paths, introducing molten material into the die through the die aperture and allowing a portion of the material to flow along the channels, allowing the material to solidify and then ejecting the solidified material from the die.

22. A method for casting a turbine housing according to claim 21, further comprising providing the channels so that material flows along two flow paths between the aperture and a flange defined on the inlet duct.

23. A method for casting according to claim 21, wherein the flow paths are divergent.

24. A method according to claim 21, wherein channels increase in width in the direction from the first to the second surfaces.

* * * * *